3,201,867
HOLDER FOR INJECTOR TYPE RAZOR BLADES TO SCRAPE WITH
Grover Case, 27311 Beech Drive, Euclid 32, Ohio
Filed Dec. 10, 1962, Ser. No. 243,386
3 Claims. (Cl. 30—169)

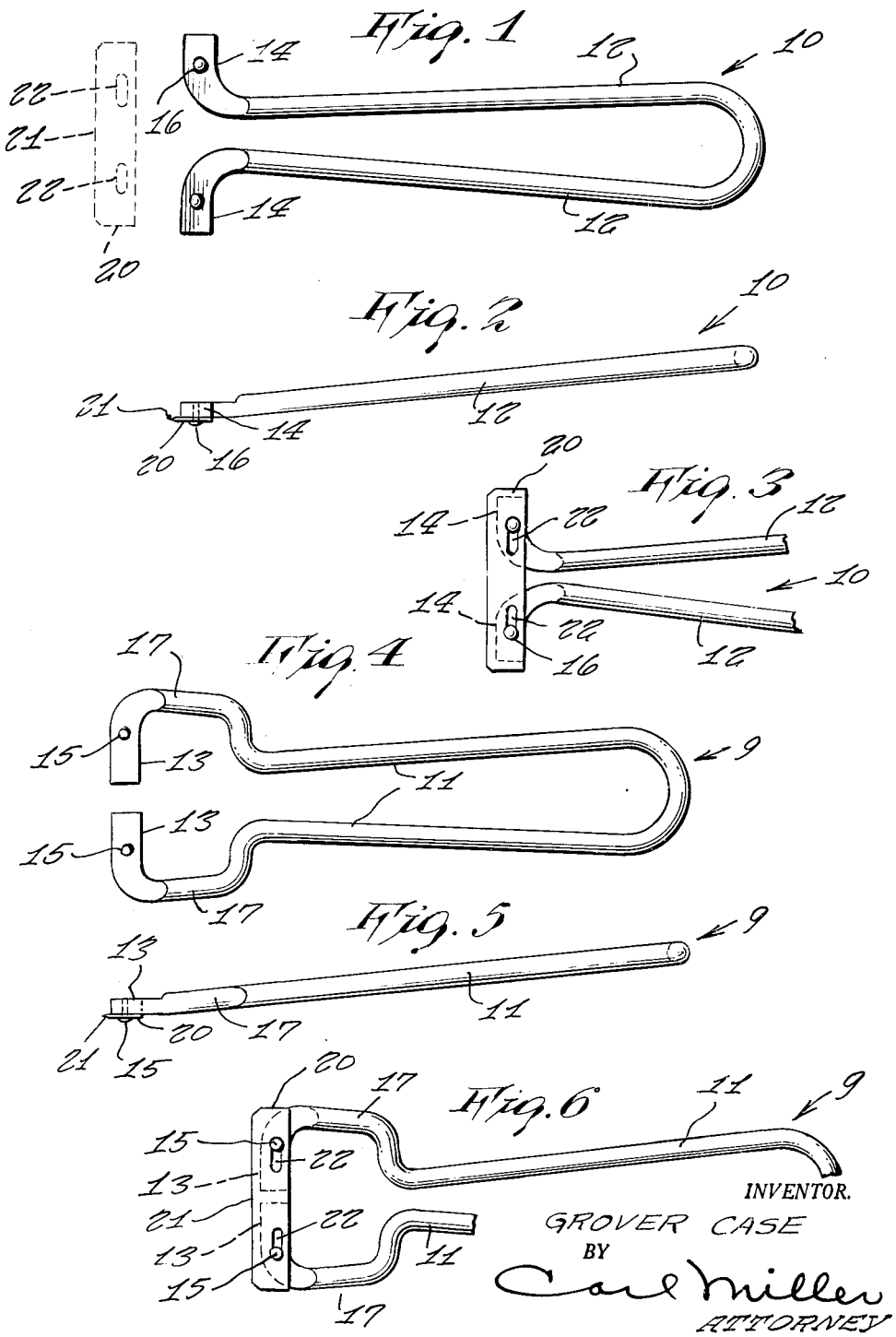

This invention relates generally to hand type tool and specifically to blade type scrapers and the like or blade holders.

Blade holders presently available are large, cumbersome, and expensive. Further, such holders are so constructed that it is extremely difficult to remove and replace blades.

Therefore, it is an object of this invention to provide a blade holder which is inexpensive and rugged.

Another object of this invention is to provide a handle for releasably supporting a blade for use.

Still another object of this invention is to provide the aforementioned handle which removal and replacement of blades with facility.

And another object of this invention is to provide the aforementioned handle which exerts a spring force for locking a blade in place for use.

The foregoing and other objects and advantages will become apparent to those skilled in the art by referring to the following description and the accompanying drawings, wherein:

FIGURE 1 is a plan view of a blade holder made in accordance with the invention, the blade to be held being shown in phantom, FIGURE 2 is a side elevation of the novel blade holder of FIGURE 1 with a blade held thereby, FIGURE 3 is a bottom plan view of a portion of the blade holder of FIGURE 2 and the blade held thereby, FIGURE 4 is a plan view similar to FIGURE 1 of a modified blade holder made in accordance with the invention, FIGURE 5 is a side elevation similar to FIGURE 2 of the modified holder of FIGURE 4 with a blade held thereby, FIGURE 6 is a bottom plan view similar to FIGURE 3 of a portion of the holder of FIGURE 5 and the blade held thereby.

Now referring to the drawings and particularly to FIGURES 1 to 3, a holder 10 made in accordance with the invention has a pair of coextensive legs 12 connected to each other at one end by a bight portion to provide a spring action to urge the legs apart in the manner well known. The other end of the legs 12 have foot portions 14 aligned with each other and extending generally transverse to the axis of the handle 10. Foot portions 14, in this instance extend laterally outwardly from the holder 10 in transverse alignment and in a direction away from each other. Each foot portion 14 is formed with flat upper and lower sides and of a length substantially one-half the length of the blade 20 and of a width corresponding to the width of the blade less its cutting edge as clearly shown in FIGURES 3 and 6. The flat sides of each foot portion extend rearwardly in curved formation at their junction with the legs 12, such as to extend beyond the back edge of the blade to be mounted thereon, see FIGURES 3 and 6. A pin 16 is fixed in each foot portion and has a head spaced therefrom.

A razor blade 20 such as employed in an injector blade type razor of a make well known has a single sharp edge 21 to be used for cutting or scraping. Blade 20 is of narrow rectangular formation as shown in FIGURES 1, 3 and 6, and also has a pair of spaced slots 22 extending lengthwise thereof. As is clearly shown in FIGURE 1, pins 16 are spaced further apart than the outermost ends of the slots 22. Thus, to mount blade 20 on holder 10, legs 12 are moved toward one another and the pins 16 are inserted in slots 22. Legs 12 are then released and move away from each other until the pins 16 engage the outer end of slots 22, the blade being held between the pin heads and the foot portions 14.

Holder 10 is made from a rod bent to shape that is preferably a spring material such as spring steel. A modified holder 9 is shown in FIGURES 4 to 6 and is preferably made of similar material.

Holder 9 has a pair of legs 11, corresponding to legs 12 of holder 10, which are attached to each other at one end. Legs 11 terminate at their other ends in aligned foot portions 13 corresponding in all respects to foot portions 14. In this instance, foot portions 13 extend toward one another and are connected to the legs 11 by outwardly offset portions 17. Pins 15 corresponding to pins 16 are fixed in foot portions 13 to hold a blade 20. Holder 9 is used in the same manner as holder 10.

It will of course, be understood that various details of construction may be varied through a wide range without departing from the principles of this invention and it is, therefore, not the purpose to limit the patent grant hereon otherwise than necessitated by the scope of the appended claims.

Having thus described my invention, what I claim as new and desire to secure by Letters Patent is:

1. In combination with a narrow substantially rectangular blade having a single cutting edge along one of the longer sides thereof and a pair of aligned slots extending lengthwise thereof, a holder for the blade comprising:
(a) a pair of spaced legs,
(b) spring means connecting adjacent ends of said legs for urging the same apart,
(c) a foot portion at the end of each leg opposite the connected end thereof,
(d) said foot portions arranged in opposed transverse alignment,
(e) each said foot portion having flat upper and lower sides and of a length substantially half the length of the blade and of a width corresponding to the width of the blade less its cutting edge,
(f) said foot portions extending arcuately rearwardly beyond the rear edge of the blade at their juncture with said legs,
(g) a headed pin fixed to each foot portion at corresponding flat sides thereof and normally spaced apart from each other a greater distance than the distance between the outer ends of said slots,
(h) said legs being movable toward one another against the force of the spring means to align the pins with the blade slots,
(i) said pins when so aligned, being insertable in the slots and under the action of the spring force on said legs engaging the outer ends of the slots, whereby to seat and secure the blade flat against the pin carrying side of the foot portions; the relationship of the blade to the foot portions being such that the single cutting edge of the blade projects beyond the forward edge of the foot portions with the rear edge of the blade lying in substantial registry with the rear edge of the foot portions and the arcuate portion of the foot portions extending rearwardly beyond said rear edge of the blade whereby to provide a maximum area of support for the blade.

2. The combined blade and holder of claim 1, wherein:
  (a) said foot portions extend laterally away from each other.

3. The combined blade and holder of claim 1, wherein:
  (a) said foot portions extend laterally towards each other.

References Cited by the Examiner

UNITED STATES PATENTS

| | | | |
|---|---|---|---|
| 868,588 | 10/07 | Ward | 30—337 X |
| 936,654 | 10/09 | McIntire | 30—169 X |
| 1,095,617 | 5/14 | Armitage | 30—339 |
| 1,223,238 | 4/17 | Battige | 30—169 |
| 1,529,309 | 3/25 | Hoegberg | 30—169 |
| 1,558,021 | 10/25 | Libi | 30—339 X |
| 1,978,857 | 10/34 | Chalmers | 30—339 X |
| 1,995,959 | 3/35 | Blum | 30—169 X |

WILLIAM FELDMAN, *Primary Examiner.*

EDWARD V. BENHAM, *Examiner.*